US008793658B2

(12) United States Patent
Herden et al.

(10) Patent No.: US 8,793,658 B2
(45) Date of Patent: Jul. 29, 2014

(54) METHOD FOR OPERATING A HOUSEHOLD APPLIANCE AND HOUSEHOLD APPLIANCE INTENDED FOR USE IN SUCH A METHOD

(75) Inventors: Rudolf Herden, Herzebrock-Clarhotz (DE); Annette Meyer, Brake (DE); Achim Schoening, Bielefeld (DE); Christian Schrutek, Karlsruhe (DE); Ralf Westerheide, Hilter (DE)

(73) Assignee: Miele & Cie. KG, Guetersloh (DE)

( * ) Notice: Subject to any disclaimer, the term of this patent is extended or adjusted under 35 U.S.C. 154(b) by 82 days.

(21) Appl. No.: 13/617,174

(22) Filed: Sep. 14, 2012

(65) Prior Publication Data

US 2013/0074047 A1 Mar. 21, 2013

(30) Foreign Application Priority Data

Sep. 20, 2011 (EP) .................................... 11401594

(51) Int. Cl.
*G06F 9/44* (2006.01)
*G06F 9/445* (2006.01)
(52) U.S. Cl.
CPC ....................................... *G06F 8/65* (2013.01)
USPC ........................... 717/126; 717/173; 717/178
(58) Field of Classification Search
CPC ...................................... G06F 8/60; G06F 8/65
USPC ................................................. 717/173, 178
See application file for complete search history.

(56) References Cited

U.S. PATENT DOCUMENTS

| 6,873,876 | B1* | 3/2005 | Aisa ................................. 700/86 |
| 2002/0095483 | A1 | 7/2002 | Lee et al. |
| 2005/0015458 | A1* | 1/2005 | La ................................. 709/208 |
| 2005/0086322 | A1* | 4/2005 | Park ............................. 709/217 |
| 2006/0069912 | A1 | 3/2006 | Zheng et al. |
| 2012/0116959 | A1 | 5/2012 | Pitroda et al. |

OTHER PUBLICATIONS

European Patent Office, Extended European Search Report in European Patent Application No. 11 40 1594 (Feb. 22, 2012).

* cited by examiner

*Primary Examiner* — Phillip H Nguyen
(74) *Attorney, Agent, or Firm* — Leydig, Voit & Mayer, Ltd.

(57) ABSTRACT

A method for operating a household appliance uses a computer that is communicatively connectable to the household appliance or is part of the household appliance. The household appliance includes a memory containing a control program and at least one appliance program executable by the control program, and a processing unit configured to execute the control program. The computer is communicatively connectable to the Internet and includes a computer program configured to exchange data between the household appliance and a database available on the Internet. At least one appliance program available in the database is selected using the computer under control of the computer program, is transmitted to the computer and is transferred into the memory of the household appliance from the computer.

11 Claims, 4 Drawing Sheets

METHOD FOR OPERATING A HOUSEHOLD APPLIANCE AND HOUSEHOLD APPLIANCE INTENDED FOR USE IN SUCH A METHOD

CROSS REFERENCE TO RELATED APPLICATIONS

This application claims priority to European Patent No. EP 11 401 594.4-2206, filed Sep. 20, 2011, which is hereby incorporated by reference herein in its entirety.

FIELD

The present invention relates to a method for operating a household appliance, and further to a household appliance intended for use in the method.

BACKGROUND

The household appliances described herein include those used in private homes. Such household appliances are per se known. It is also known that such household appliances have a memory containing a control program and at least one appliance program executable by the control program, as well as a processing unit in the form of or similar to a microprocessor for executing the control program.

Although the household appliances commonly used today are delivered with several appliance programs covering the main uses, the user sometimes develops the desire to have available appliance programs that are matched as precisely as possible to specific situations of use. On the other hand, in connection with one or more appliance programs, such as are provided in a household appliance during its manufacture and/or delivery, it may happen that new insights emerge which make it seem advisable to adapt or modify the appliance program. This leads to the desire to be able to adapt one or more appliance programs, or to add further appliance programs, even after delivery of the household appliance.

SUMMARY

In an embodiment, the present invention provides a method for operating a household appliance using a computer that is communicatively connectable to the household appliance or is part of the household appliance. The household appliance includes a memory containing a control program and at least one appliance program executable by the control program, and a processing unit configured to execute the control program. The computer is communicatively connectable to the Internet and includes a computer program configured to exchange data between the household appliance and a database available on the Internet. At least one appliance program available in the database is selected using the computer under control of the computer program, is transmitted to the computer and is transferred into the memory of the household appliance from the computer.

BRIEF DESCRIPTION OF THE DRAWINGS

Exemplary embodiments of the present invention will be described in more detail below with reference to the drawings. Corresponding objects or elements are identified by the same reference numerals in all figures. It is understood that neither this nor any other exemplary embodiment should be construed as limiting the scope of the present invention. Rather, within the framework of the present disclosure, numerous revisions and modifications are possible, in particular such variants, elements and combinations and/or materials, which, for example, by combining or altering individual features or elements or method steps described in connection with the general description and the, or each, particular embodiment, as well as the claims, and contained in the drawings, may be inferred by one skilled in the art, and lead, through combinable features, to a new subject matter or to new method steps or sequences of method steps. In the drawing.

DETAILED DESCRIPTION

Figure 1:
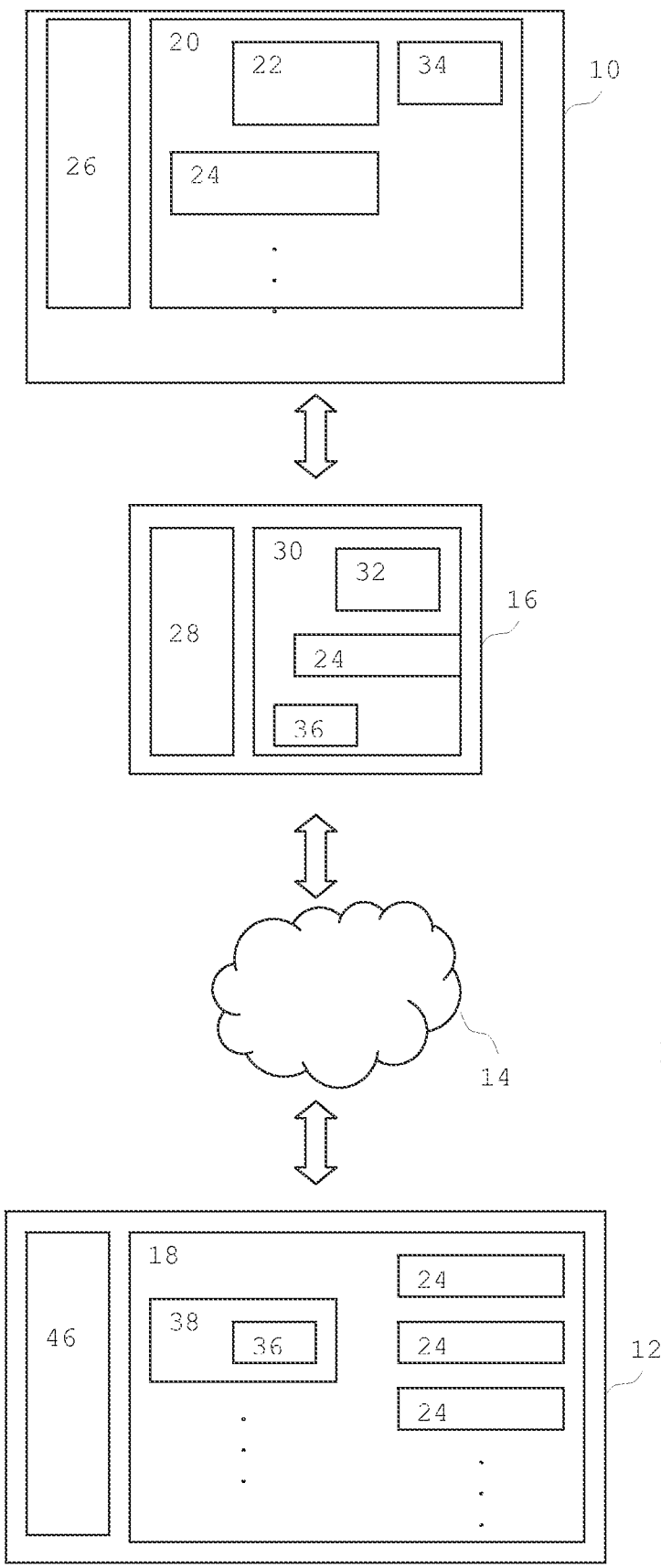
FIG. 1 shows, in simplified schematic form, a system including a household appliance and a database available on the Internet, as well as a computer functioning as an interface between the household appliance and the database.

In an embodiment, the present invention provides a method that allows appliance programs to be adapted and/or supplemented, even after delivery of the household appliance.

In an embodiment, the present invention provides a method for operating a household appliance, the household appliance including a memory containing a control program and at least one appliance program executable by the control program and further including a processing unit for executing the control program, in which a computer, which is communicatively connectable to the Internet and the household appliance, or is included in the household appliance and then communicatively connectable to at least the Internet, contains a computer program for exchanging data with the household appliance and a database available on the Internet; and that, by means of the computer under the control of the computer program, at least one appliance program available in the database is selected therein, transmitted to the computer, and transferred from there into the memory of the household appliance.

Embodiments of the invention allow additional or updated appliance programs to be loaded onto the household appliance from the database which is available on the Internet and can be accessed by the computer in the manner of what is known as a web shop or the like. This allows the user of the household appliance to supplement or optimize the functionality thereof. When the terms "appliance program" and "appliance programs" are used here and below, it should be noted that the present invention is generally suitable for transferring one or a plurality of appliance programs. Neither the singular nor the plural form of this term should be construed as a limitation.

The computer communicatively connectable to the Internet and the household appliance may be, for example, a so-called personal computer or a mobile computer in the form of a laptop, notebook, handheld, etc. Today, such computers already exist in many households, so that such a computer lends itself as an interface between the household appliance and the database accessible on the Internet, A computer communicatively connectable to the Internet may already be included in the household appliance. In this case, a communicative connection between such a computer and the household appliance already exists, so that such a computer only needs to be also communicatively connected to the Internet.

This may be accomplished, for example, by providing a so-called WLAN interface and establishing a communicative connection to the Internet via a per se known WLAN router. A computer included in the household appliance may also be, for example, the controller thereof, provided the controller is extended by a corresponding communications interface and the control program is supplemented with routines for data transmission.

By establishing a connection to the database available on the Internet by means of the computer under the control of the computer program, and by selecting in the database at least one appliance program available therein, the user can decide to which extent he or she wants to optimize and/or supplement the functionality of his or her household appliance. The or each appliance program selected in this manner is transmitted to the computer and transferred from there into the memory of the household appliance. Once a new, supplemented or optimized appliance program is properly transferred into the memory of the household appliance, it is available for execution by the control program of the household appliance, and the supplementation or optimization of the functionality of the appliance is complete.

In an embodiment of the method, provision is made that when the database is accessed for the first time in connection with a logon or the like for access to the database, a signature is generated based on at least an identifier identifying the household appliance, and that this signature is stored in a data set in the area of the database and transmitted to the computer. In connection with the selection of an appliance program, the signature present in the computer is transmitted by the computer and, in the area of the database, compared to the or each of the signature(s) stored therein and, if the comparison is successful, the or each selected appliance program is encoded with at least the identifier identifying the household appliance and transmitted to the computer. The logon for access to the database permits the database provider to implement access control. This can be accomplished particularly easily by generating a signature in connection with the logon and storing this signature at both parties to later communications processes; i.e., in the area of the database and on the computer. In the area of the database, it is expedient to store the signature in a data set, so that further information can be provided in the data set in addition to the signature. In connection with the selection of an appliance program; i.e., during the communicative connection with the database for selecting such an appliance program, the signature present in the computer is transmitted by the computer prior to, during, or after the selection of the appliance program and, in the area of the database, is compared to the or each of the signature(s) stored therein. A comparison to each of the signatures stored in the area of the database does not necessarily mean that the transmitted signature is actually compared to each individual signature stored in the area of the database. Rather, provision may also be made to group the stored signatures, for example, by an identifier, such as a sequential number or the like, so that a comparison to a reduced number of stored signatures is sufficient to authenticate the transmitted signature. One example in this regard is what is known as a "balanced tree" created based on the identifiers. Here, the identifier of the transmitted signature is first compared to the identifier at the root of such a tree and, depending on whether the transmitted identifier is greater or smaller than the identifier at the root of the tree, the procedure progresses on the right or left in the tree and this comparison is repeated at the following nodes of the tree. Even if there is a large number of stored data sets, the number of required comparisons is reduced to a minimum in this way or another. In the case of a successful comparison; i.e., if the signature transmitted by the computer is authenticated, the or each selected appliance program can be transmitted to the computer.

If the intended use is in a washing machine, the following aspect should be pointed out: In a specific embodiment, in order to prevent downloaded appliance programs, here washing machine programs, from being executed on a household appliance or automatic washing machine which is not suited for the execution thereof, causing damage to the particular wash load or even to the household appliance, provision is made that, in connection with the transmission to the computer; i.e., prior to, during or after the transmission, the or each selected washing machine program is encoded with at least the identifier identifying the automatic washing machine. This encoding may be accomplished by extending the washing machine program with the identifier, or also by encoding the washing machine program with the identifier, or else by converting the washing machine program in any other way using the identifier. In any case, the code is one that can be decoded by the automatic washing machine, for example, by checking if a washing machine program transferred in this manner includes the identifier, or can be decoded with the identifier, and doing so before the washing machine program is executed. This sequence of operation can also be suitably implemented for other household appliances.

Thus, in an embodiment of the method, at least one washing machine program transmitted from the database is selected on the computer for transfer to the household appliance, and, in connection with the transfer to the household appliance, the control program of the household appliance checks the or each appliance program transferred, or to be transferred, with regard to its encoding with the identifier identifying the household appliance. In addition, in a specific embodiment, provision is made that if the check is successful, an acknowledgement is generated by the control program of the household appliance and sent to the computer. Such acknowledgement indicates to the user that the or each appliance program was successfully transferred to the household appliance and, in the case of a computer that is independent of the household appliance, the communicative connection between the computer and the household appliance may then be disconnected.

If the acknowledgement generated by the household appliance is transmitted to the database by means of the computer under the control of the computer program, the successful transfer of the or each appliance program can also be notified to the database.

In another embodiment of the method, it is provided that, based on the transmitted signature and the identifier included therein, a processing program provided in the area of the database for access to the same, such as, for example, a specific webshop program, selects, from a plurality of appliance programs available in the database, a group of appliance programs that can be identified as suitable for the underlying household appliance based on the identifier. Thus, when the user accesses the database, he or she does not need to recognize or decide himself/herself which of the appliance programs contained in the database are suitable for his or her household appliance. This makes the use of the database and the selection of one or more appliance programs much easier and especially more straightforward. The identifier transmitted for identifying the respective household appliance is, for example, a serial number which either indicates the type of the respective household appliance or can be used to determine the type of the respective household appliance from a production database. Thus, the suitability of an appliance program for a specific household appliance can be encoded based on the types of the appliances for which the program is suitable. This can be done, for example, by providing the appliance program in a data set which, in addition to the appliance program, contains at least one entry for a type of a household appliance for which the program is suitable. In this or a similar way, it is easily possible to determine a group of appliance programs which are relevant to the user of the household appliance who carries out the method.

In a specific embodiment of this aspect of the method, the processing program, based on the signature transmitted by the computer, determines a data set containing a matching signature, and logs selected and/or transmitted appliance programs in the data set. The data set selected by the processing program based on the transmitted signature is available to the user or to his or her appliance program, depending on the point of view, and because selected and/or transmitted programs are logged in this data set, the user may, for example, preselect one or more appliance programs without having to cause the or each selected appliance program to be immediately transmitted (downloaded) to the computer. Thus, the user can log on to the database again later and use a selection made earlier. In addition, depending on the business model of the database provider, logging makes it possible to charge the respective services to the user.

In this connection, a specific embodiment has the feature that the appliance programs which are logged in the data set are those for which an acknowledgement generated by the household appliance was transmitted. The acknowledgement is generated by the household appliance upon successful transfer of an appliance program. If such an acknowledgement is transmitted to the database, the appliance programs already downloaded can be logged in the data set representing the user/the household appliance, so that when the user accesses the database at later points in time, an already downloaded appliance program does not need to be offered again, which provides increased clarity about the functionality of the database.

Another embodiment of the method has the feature that when an appliance program is transferred into the memory of the household appliance, it is first transferred into a memory area marked as free, that the integrity of the transferred appliance program is checked when the transfer is complete, and that the transferred appliance program is marked as usable only if the check is successful. This embodiment of the method takes into account errors which may occur during the transfer of an appliance program from the computer into the memory of the household appliance. Only a completely and correctly transferred appliance program may be executed by the control program of the household appliance, because otherwise there would be a risk of damage to the wash load or to the household appliance. Checking the integrity of the transferred appliance program ensures the completeness and correctness of the transferred appliance program. A simple way to do this is by providing the appliance program with a checksum (e.g., CRC) prior to transfer into the memory of the household appliance; i.e., either by the computer program or already in the area of the database, and by creating such a checksum for the transferred appliance program using the same creation rule, and doing so in connection with or after the transfer of appliance program into the memory of the household appliance. In this way, the integrity check is reduced to comparing the checksums. Alternatively or additionally, it is also possible to compare the appliance program in the computer with the appliance program transferred to the household appliance (e.g., binary comparison). The transferred appliance program is marked as usable only if the integrity check is successful. Only an appliance program that is marked as usable is executable by the control program of the household appliance.

In a specific embodiment of the just described aspect of the method, provision is made that when an appliance program transferred to the household appliance is marked as usable, a possible older appliance program, which is replaced by the transferred appliance program, is marked as inactive by the control program. This ensures in a simple way that when the user wishes to update the functionality of his or her household appliance; i.e., when he or she only wishes to replace an existing appliance program with an updated or optimized appliance program, only the updated or optimized appliance program will presented to the user after the transfer, thus preventing inadvertent use of the older appliance program. In addition, when the older, replaced appliance program is marked as inactive, the memory area occupied by the appliance program marked as inactive may be used later for additional appliance programs.

The recognition of whether a transferred appliance program replaces an older appliance program can be accomplished, for example, by means of an identifier identifying the household appliance, so that, in connection with the transfer of a new appliance program into the memory of the household appliance, the identification of possibly existing older appliance programs is reduced to checking the already stored appliance programs for an identical or sufficiently similar identifier. A sequential number, possibly extended with a revision number of the like, lends itself for such an identifier. By way of example, the identifier is assumed here to be in the form "17.5", for example, where the numerical value seventeen encodes the appliance program and the trailing five encodes the revision number of the appliance program. Such an identifier may be included in any appliance program in any form, for example, as a so-called "string", a high byte and low byte, etc.

Overall, therefore, the present invention also relates to a household appliance for use in a method as described here and below, the household appliance including a memory and a control program which is loaded in or loadable into the memory and includes computer program instructions for generating a signature based on an identifier identifying the household appliance, computer program instructions for executing an appliance program loaded into the memory, computer program instructions for transferring an appliance program received by transmission from an external source into the memory, and further including computer program instructions for checking the integrity of an appliance program transferred into the memory.

A specific embodiment of the household appliance has the feature that the control program also includes computer program instructions for comparing the transferred appliance program with appliance programs already present in the memory. As described above, such a comparison does not necessarily refer to the appliance program itself, but rather may be reduced to comparing identifiers that encode the respective appliance programs.

Since various aspects of the invention are implemented in software, the present invention also relates, firstly, to a computer program including program code instructions executable by a computer, and secondly, to a memory medium containing such a computer program, and finally also to a controller into whose memory such a computer program is loaded or loadable as a means for implementing the method and embodiments thereof. Such a computer program is the control program of the household appliance, the processing program in the area of the database, and finally also the computer program on the computer that functions as an interface between the household appliance and the database.

Thus, embodiments of the present invention allow the functionality of a household appliance to be dynamically supplemented or adapted by updating or supplementing existing appliance programs. Via the database available on the Internet, the manufacturer of the appliance can make updated or additional appliance programs available to users of their appliances, and thereby increases the attractiveness of the appliances. In addition, when a user makes a purchasing decision, he or she does not have to worry that the functionality of the respective household appliance might become outdated in the foreseeable future, for example, because no special appliance program is available for new textiles, such as functional textiles for sports activities. Conversely, the appliance manufacturer is able to better assess the interests of their customers based on the access to the database. This allows the manufacturer to draw conclusions about supplementations or modifications that current users may wish to make to the current functionality, and thus to be able to keep these and other customers satisfied to the maximum.

FIG. 1 shows a household appliance 10 and a web server 12 in simplified schematic form. An automatic washing machine 10 is used here as an example of a household appliance 10. Web server 12 is accessible through the Internet 14, here represented as a cloud. A computer 16 functions as an interface or connecting device between automatic washing machine 10 and web server 12. Computer 16 is communicatively connectable to the Internet 14 and automatic washing machine 10 or included in or incorporated into automatic washing machine 10. The communicative connectivity is symbolized in FIG. 1 by block arrows and may be provided by any type of communicative connection, for example, a wireless or wired communicative connection. In any case, the communicative connection permits data exchange between computer 16 and household appliance 10 on the one hand, and between computer 16 and a database 18 available on web server 12 on the Internet 14. The path from computer 16 to household appliance 10 and vice versa, and the path from computer 16 to web server 12 or database 18 and vice versa, do not necessarily need to use the same communications protocol to exchange the respective data. The data exchange between computer 16 and automatic washing machine 10 may very well be accomplished using a proprietary communications protocol or a communications protocol for serial connections such as, for example, RS-232, USB, or a protocol for wireless infrared or radio communications, etc. Data transmission on the Internet 14 is typically accomplished using IP-based protocols.

Automatic washing machine 10 includes a memory 20 containing a control program 22 and at least one appliance program 24 executable by control program 22. During the operation of household appliance 10, control program 22 is executed by a processing unit 26 in the form of or similar to a microprocessor. Computer 16 includes, in a generally known manner, such a processing unit 28 and a memory 30. A computer program 32 is loaded or loadable into memory 30, the exchange of data with automatic washing machine 10 and the database 18 available on the Internet 14 being performed under the control of said computer program. To this end, at least one appliance program 24 available in database 18 is selected therein by means of computer 16 under the control of computer program 32, transmitted to computer 16 and transferred from there into memory 20 of household appliance 10.

When database 18 is accessed for the first time in connection with a logon for access to database 18, a signature 36 is generated based on at least an identifier 34, which identifies household appliance 10 and may be stored, for example, in memory 20 of household appliance 10, and which is equal to or generated from a serial number of household appliance 10; said signature 36 being stored in the area of database 18 in a data set 18 and transmitted to computer 16. In connection with the selection of an appliance program 24 in database 18, the signature 36 present in computer 16 is transmitted by computer 16 and, in the area of database 18, compared to the or each signature 36 stored therein. If the comparison is successful, the or each selected appliance program 24 is provided or encoded with at least the identifier 34 identifying the household appliance; i.e., the data on which signature 36 is at least partially based, and transmitted to computer 16.

Figure 2:
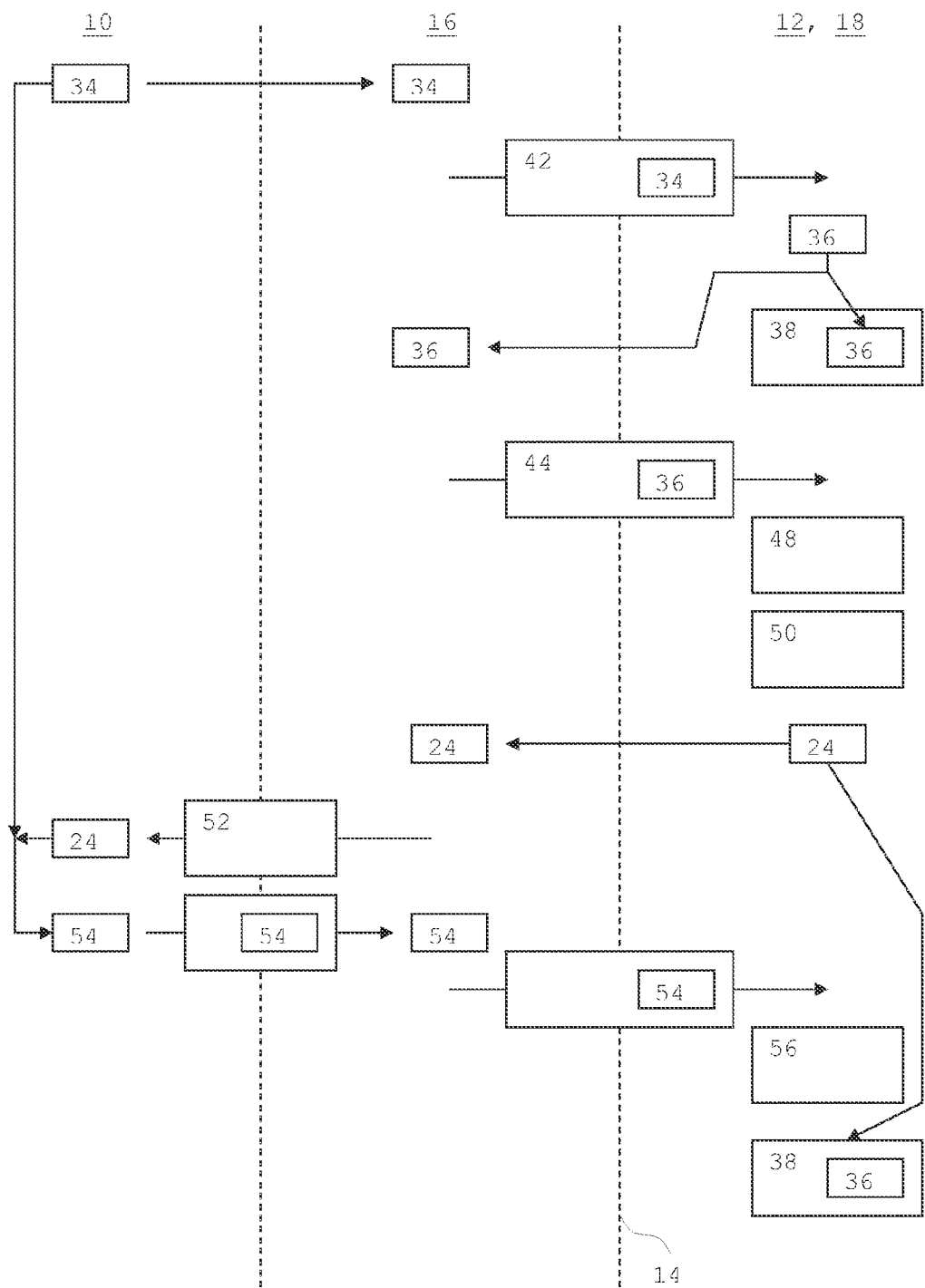
FIG. 2 illustrates, in simplified schematic form, a sequence of selecting an appliance program in the database, and of transferring the appliance program to the household appliance.

In this regard, FIG. 2 shows the method with further details in a simplified schematic representation in the form what is known as a space-time diagram. The diagram is divided into three columns. The left column represents the area of household appliance 10 and has a corresponding reference numeral written in at the top. The middle column represents the area of computer 16, which functions as an interface or data transport medium between household appliance 10 and database 18. The middle column also has a corresponding reference numeral written in at the top. The right column represents the area of web server 12 and database 18 and has corresponding reference numerals written in at the top.

With reference to the diagram and description of FIG. 1, FIG. 2 shows that first the identifier 34 identifying household appliance 10 is transmitted to computer 16. Once identifier 34 is available on computer 16, a logon 42 may be performed using computer 16 during first access to database 18. Then, in connection with logon 42 for accessing database 18, a signature 36 is generated based on at least the identifier 34 identifying household appliance 10, and stored in the area of database 18 in a data set 38, as well as transmitted to computer 16. In connection with the selection 44 of an appliance program 24, the signature 36 present in computer 16 is transmitted by computer 16 to web server 12 and compared by processing unit 46 (FIG. 1) and the associated processing program of web server 12; i.e., in the area of database 18, to the or each of the signature(s) 36 stored therein. If comparison 48 is successful, the or each selected appliance program 24 is provided or encoded with at least the identifier 34 identifying household appliance 10 (encoding 50). Subsequently, the or each appliance program 24 so encoded is transmitted to computer 16. Then, at least one appliance program 24 transmitted from database 18 is selected on computer 16 for transfer 52 to household appliance 10. In connection with transfer 52 to household appliance 10, control program 22 of household appliance 10 checks the or each appliance program 24 transferred, or to be transferred, with regard to its encoding with the identifier 31 identifying household appliance 10, and further checks whether transfer 52 was completed successfully.

In a specific embodiment of the method, provision is made that if the check is successful, control program 22 of household appliance 10 generates an acknowledgement 54 and sends it to computer 16. The transmission of acknowledgement 54 indicates to computer 16 and its computer program 28 that an appliance program 21 was successfully transferred into memory 20 of household appliance 10. In addition, the acknowledgement generated by household appliance 10 may be transmitted to web server 12 or database 18 by means of computer 16 under the control of its computer program 28. Using the received acknowledgement 54, it is possible to log 56 those appliance programs 24 which were transmitted to household appliance 10. Such logging can be accomplished, in particular, using the data set 38 created to receive the signature 36 identifying the respective household appliance 10.

Figure 3:
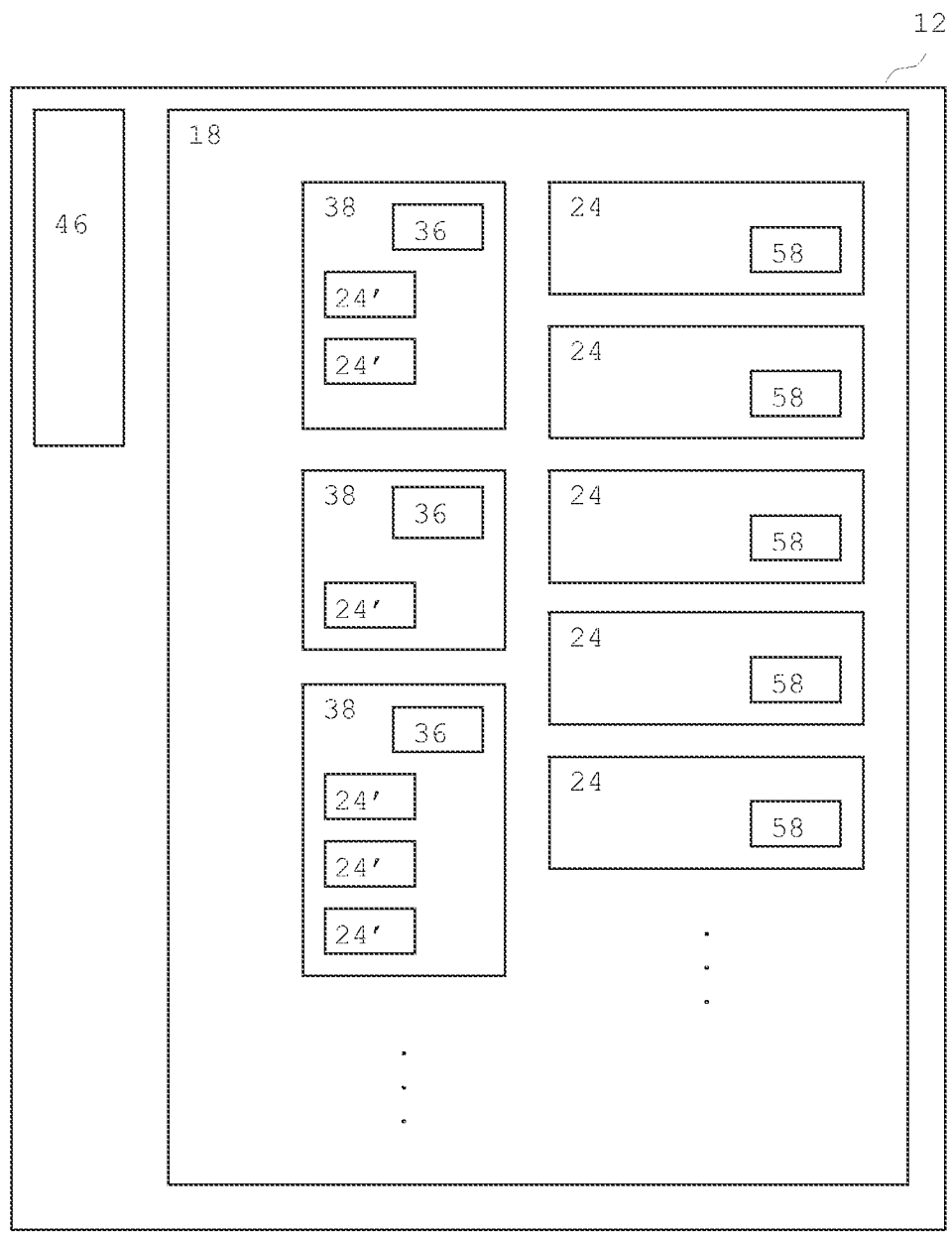
FIG. 3 shows further details of the database.

FIG. 3 shows web sever 12 as well as database 18 and the contents thereof with further details. In one embodiment of the method, it is provided that, based on the particular transmitted signature 36 and the identifier 34 (FIG. 1), which identifies household appliance 10 and which is directly or indirectly included in the signature, for example, because signature 36 is derived directly or indirectly from, identifier 34, the processing unit 46 for accessing database 18, selects, from a plurality of appliance programs 24 available in database 18, a group of appliance programs 24 that can be identified as suitable for the underlying household appliance 10 based on the appliance-type-specific identifier 34. To this end, provision is made for each appliance program 24 to have an identification number 58 or other individual program identifier 58. By comparing the identifier 34 encoding household appliance 10 to identification number 58, each appliance program 24 can be identified either as suitable for the respective household appliance 10 or as not suitable for household appliance 10. The or each of the appliance programs 24 identified as suitable form the group of appliance programs 24 that is selected by processing program 46 to be offered for selection to a user of computer 16 upon access to database 18. FIG. 3 further shows that processing unit 46, based on the signature 36 transmitted by computer 16, determines a data set 38 containing a matching signature 36, and logs selected and/or transmitted appliance programs 24' in data set 38. If only those appliance programs 24' are stored in data set 38 for which an acknowledgement 54 generated by household appliance 10 was transmitted, then, the next time the time database 18 is accessed, the group of appliance programs 24 that were identified as suitable for household appliance 10 based on signature 36 and the identifier 34 included therein may be reduced by the or each transmitted appliance program 24, thus providing a clear overview of the appliance programs 24 in database 18 that are still relevant to the user of household appliance 10.

Figure 4:
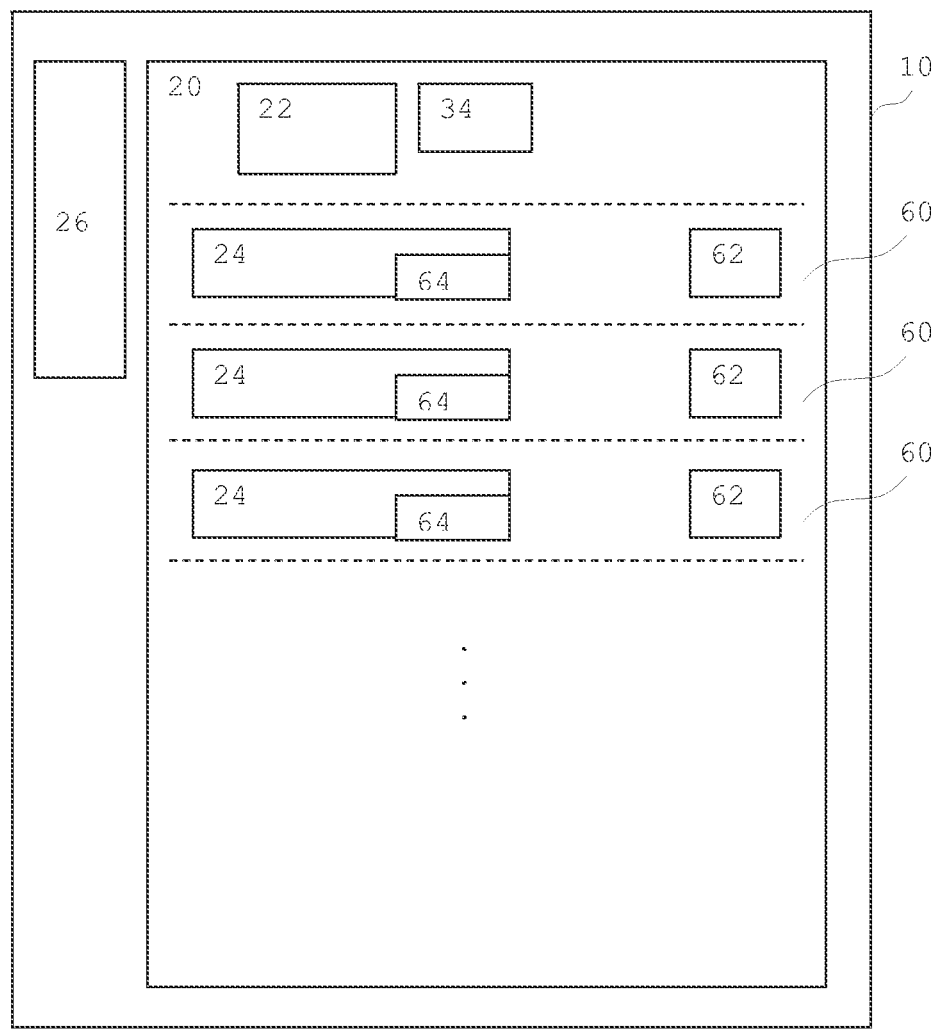
FIG. 4 illustrates further details of the household appliance, specifically a simplified schematic representation of contents of its memory, namely a control program and at least one appliance program.

Finally, FIG. 4 shows details of the controller of household appliance 10. Conventional functional units of household appliance 10, such as, for example, the washing drum, are omitted here. FIG. 4 shows that memory areas 60 for receiving appliance programs are formed in memory 20 of the controller of household appliance 10. When an appliance program 24 is transferred into memory 20 of household appliance 10, it is first transferred into a memory area 60 marked as free. After the transfer is complete, the transferred appliance program 24 is checked for integrity, and it is marked as usable only if the check is successful. This aspect of a specific embodiment of the method may be implemented in various equivalent ways. The integrity check of the transferred appliance program 24 may be performed by a comparison of an identifier, such as a CRC signature. In order to mark an appliance program 24 as usable, it is possible to correspondingly mark appliance program 24 itself or the respective memory area 60. In FIG. 4, such a marking 62 is shown for memory area 60. Depending on the value of this marking 62, it may mark memory area 60 as free or mark the appliance program 24 contained therein as usable.

In a another embodiment of the method, provision is made that when an appliance program 24 transferred to household appliance 10 is marked as usable, a possible older appliance program 24, which is replaced by the transferred appliance program 24, is marked as inactive by control program 22. The aforementioned marking 62 associated with a particular memory area 60 may also be used to mark an older appliance program 24 as inactive. In order to recognize whether a transferred appliance program 24 replaces an older appliance program 24, in the simplest case, each appliance program 24 includes an identification number 64 associated with the respective program 24, and possibly extended with a revision number, so that, by comparing identification number 64, it is possible to detect whether several identical appliance programs 24 are present in memory 20. In particular, in connection with the transfer of a new appliance program 24, its identification number 64 may be compared to the identification numbers 64 of all appliance programs 24 already present in memory 20, and if an older appliance programs 24 to be replaced by the transferred appliance program 24 is found, the older one may be marked as inactive.

Thus, various salient aspects of the description given herein can be briefly summarized as follows: Disclosed is a method for updating or supplementing appliance programs 24 in the memory 20 of a household appliance 10, the method including the following steps: A communicative connection is established between household appliance 10 and a database 18 available on the Internet 14. At least one appliance program 24 is selected in database 18. The or each selected appliance program 24 is transmitted to automatic washing machine 10 and transferred into its memory 20. Prior to or in connection with the transmission to household appliance 10, the or each selected appliance program 24 may be encoded with an identifier 34 identifying household appliance 10, so that each transmitted appliance program 24 is individualized for the household appliance 10 for which it is intended.

While the invention has been particularly shown and described with reference to preferred embodiments thereof, it will be understood by those skilled in the art that various changes in form and details may be made therein without departing from the spirit and scope of the invention.

LIST OF REFERENCE NUMERALS 10 automatic washing machine
12 web server
14 Internet
16 computer
18 database
20 memory (of the household appliance)
22 control program
24 washing machine program, appliance program
26 processing unit (of the automatic washing machine/of the household appliance)
28 processing unit (of the computer)
30 memory (of the computer)
32 computer program
34 identifier
36 signature
38 data set
40 ./.
42 logon
44 selection
46 processing program
48 comparison
50 encoding
52 transfer
54 acknowledgement
56 logging
58 identification number
60 memory area
62 marking
64 identification number

What is claimed is:

1. A method for operating a household appliance that includes a memory containing a control program and at least one appliance program executable by the control program, and a processing unit configured to execute the control program, the method comprising:

provoding a computer that is communicatively connectable to the household appliance or is part of the household appliance, the computer being communicatively connectable to the Internet and including a computer program configured to exchange data between the household appliance and a database available on the Internet;

generating a signature based on at least an identifier identifying the household appliance upon accessing the database for a first time in connection with a logon for access to the database;

storing the signature in an area of the database in a data set;

transmitting the signature to the computer;

selecting at least one appliance program available in the database using the computer under control of the computer program;

transmitting the signature present in the computer in connection with the selecting the at least one appliance program;

comparing the signature with each signature stored in the area of the database;

encoding the selected at least one appliance program with the identifier identifying the household appliance and transmitting the at least one appliance program to the computer if the comparison is successful; and transferring the at least one appliance program into the memory of the household appliance from the computer.

2. The method recited in claim 1, further comprising selecting, on the computer, the at least one appliance program transmitted from the database for the transferring to the household appliance, checking the at least one appliance program, using the control program, with regard to the encoded identifier identifying the household appliance, generating an acknowledgement with the control program when successful transfer of the at least one appliance program is completed, and sending the acknowledgement to the computer.

3. The method recited in claim 2, further comprising transmitting the acknowledgement to the database using the computer under control of the computer program.

4. The method recited in claim 1, further comprising selecting, using a processing program provided in an area of the database for access to the database, a group of appliance programs that are identified as suitable for the household appliance based on the transmitted signature and the identifier associated with the signature.

5. The method recited in claim 4, further comprising determining, using the processing program, a data set containing a matching signature based on the signature transmitted by the computer, and logging at least one of selected or transmitted appliance programs in the data set.

6. The method recited in claim 5, wherein the appliance programs logged in the data set correspond to appliance programs associated with a transmitted acknowledgement generated by the household appliance.

7. The method recited in claim 1. wherein the transferring the at least one appliance program into the memory includes first transferring the at least one appliance program into a memory area marked as free, and further comprising:

checking the transferred at least one appliance program for integrity, and marking the transferred at least on appliance program as usable only if the check is successful.

8. The method recited in claim 7, further comprising marking an older appliance program that is replaceable by the transferred at least one appliance program as inactive using the control program, when the transferred at least one appliance program is marked as usable.

9. A household appliance comprising:

a memory having a control program loaded into the memory; and at least one tangible non-transient computer-readable medium communicatively connectable to the Internet and having computer-executable instructions stored thereon for:

exchanging data between the household appliance and a database available on the Internet;

receiving signature based on at least an identifier identifying the household appliance upon accessing the database for a first time in connection with a Logan for access to the database, the signature being stored in an area of the data base in a data set;

selecting at least one appliance program available in the database;

transmitting, in connection with the selecting at least one appliance program, the signature so as to be compared with each signature stored in an area of the database;

receiving the at least one appliance program encoded with the identifier identifying the household appliance;

transferring the at least one appliance program into the memory;

checking an integrity of the at least one appliance program transferred into the memory; and executing the at least one appliance program loaded into the memory.

10. The household appliance recited in claim 9, wherein the control program includes computer program instructions for comparing the transferred appliance program with appliance programs already present in the memory.

11. A method for updating or supplementing appliance programs in a memory of a household appliance, the method comprising:

establishing a communicative connection between the household appliance and a database available on the Internet;

generating a signature based on at least an identifier identifying the household appliance upon accessing the database for a first time in connection with a logon for access to the database;

storing the signature in an area of the database in a data set;

transmitting the signature to the household appliance;

selecting at least one appliance program in the database;

transmitting the signature present in the household appliance in connection with the selecting the at least one appliance program;

comparing the signature with each signature stored in the area of the database;

encoding the selected at least one appliance program with the identifier identifying the household appliance and transmitting the at least one selected appliance program to the household appliance if the comparison is successful; and transferring the at least one selected appliance program into the memory of the household appliance.

* * * * *